United States Patent
Coffaro

(10) Patent No.: US 10,462,500 B2
(45) Date of Patent: Oct. 29, 2019

(54) LOCATION AGNOSTIC MEDIA CONTROL ROOM/BROADCAST FACILITY

(71) Applicant: FOX BROADCASTING COMPANY, Los Angeles, CA (US)

(72) Inventor: Joseph P. Coffaro, Thousand Oaks, CA (US)

(73) Assignee: FOX BROADCASTING COMPANY, LLC, Los Angeles, CA (US)

(*) Notice: Subject to any disclaimer, the term of this patent is extended or adjusted under 35 U.S.C. 154(b) by 80 days.

(21) Appl. No.: 15/532,726

(22) PCT Filed: Dec. 3, 2015

(86) PCT No.: PCT/US2015/063821
§ 371 (c)(1),
(2) Date: Jun. 2, 2017

(87) PCT Pub. No.: WO2016/090182
PCT Pub. Date: Jun. 9, 2016

(65) Prior Publication Data
US 2017/0359605 A1    Dec. 14, 2017

Related U.S. Application Data

(60) Provisional application No. 62/087,188, filed on Dec. 3, 2014.

(51) Int. Cl.
*H04N 21/2187* (2011.01)
*H04N 21/234* (2011.01)
(Continued)

(52) U.S. Cl.
CPC ... *H04N 21/23424* (2013.01); *H04N 21/2187* (2013.01); *H04N 21/234* (2013.01);
(Continued)

(58) Field of Classification Search
CPC .......... H04N 21/234; H04N 21/23418; H04N 21/23424
(Continued)

(56) References Cited

U.S. PATENT DOCUMENTS 7,457,363 B2 * 11/2008 Partiwala .............. H03M 7/425
375/253
7,577,762 B1 * 8/2009 Garlick ................. G06F 9/4881
345/505
(Continued)

FOREIGN PATENT DOCUMENTS

WO    2010086021    8/2010
WO    2014009197    1/2014

OTHER PUBLICATIONS

International Search Report and Written Opinion dated Oct. 23, 2015 for PCT App. No. PCT/US2015/063821 filed on Dec. 3, 2015.
(Continued)

*Primary Examiner* — Pankaj Kumar
*Assistant Examiner* — Franklin S Andramuno
(74) *Attorney, Agent, or Firm* — Gates & Cooper LLP

(57) ABSTRACT

A method and apparatus for generating a broadcast video stream from a primary video component having a live feed from a source remote from the virtual media control system in at least near real time is disclosed. Live queuing events are inserted into the live video feed and automatically interpreted to insert secondary video components that become part of a broadcast video stream.

27 Claims, 7 Drawing Sheets

(51) Int. Cl.
*H04N 21/854* (2011.01)
*H04N 21/258* (2011.01)
*H04N 21/438* (2011.01)
*H04N 21/647* (2011.01)
*H04N 21/81* (2011.01)
*H04N 21/845* (2011.01)
*H04N 21/262* (2011.01)

(52) U.S. Cl.
CPC . *H04N 21/23418* (2013.01); *H04N 21/25841* (2013.01); *H04N 21/26258* (2013.01); *H04N 21/4383* (2013.01); *H04N 21/647* (2013.01); *H04N 21/812* (2013.01); *H04N 21/8456* (2013.01); *H04N 21/854* (2013.01)

(58) Field of Classification Search
USPC .................................................. 725/51, 110
See application file for complete search history.

(56) References Cited

U.S. PATENT DOCUMENTS

| | | | |
|---|---|---|---|
| 8,234,350 B1* | 7/2012 | Gu | H04N 21/234309 709/203 |
| 8,650,192 B2 | 2/2014 | Biderman et al. | |
| 8,849,225 B1* | 9/2014 | Sullivan | H03J 7/18 455/161.1 |
| 2004/0216171 A1 | 10/2004 | Barone et al. | |
| 2004/0244043 A1* | 12/2004 | Lind | H04L 12/2801 725/111 |
| 2006/0075449 A1 | 4/2006 | Jagadeesan et al. | |
| 2007/0133546 A1* | 6/2007 | Kim | H04L 47/10 370/392 |
| 2007/0204057 A1* | 8/2007 | Shaver | G06F 17/30902 709/231 |
| 2008/0120676 A1* | 5/2008 | Morad | H04N 21/42607 725/127 |
| 2010/0118748 A1* | 5/2010 | Pratt | H04N 21/234336 370/310 |
| 2010/0195974 A1* | 8/2010 | Zheng | H04N 5/76 386/343 |
| 2011/0276994 A1 | 11/2011 | Higgins et al. | |
| 2014/0025836 A1 | 1/2014 | Gupta | |
| 2014/0254647 A1* | 9/2014 | Stott | H04L 43/50 375/224 |
| 2015/0264002 A1* | 9/2015 | Vlachogiannis | H04L 51/18 709/206 |
| 2017/0085948 A1* | 3/2017 | Kang | H04N 21/4432 |

OTHER PUBLICATIONS

International Preliminary Examination Report dated Jun. 8, 2017 for PCT App. No. PCT/US2015/063821 filed on Dec. 3, 2015.
"White Paper—Aspera fasp™ High Speed Transport: A Critical Technology Comparison"; Aspera; last retrieved Nov. 30, 2014. http://asperasoft.com/fileadmin/media/Asperasoft.com/Resources/White_Papers/fasp_Critical_Technology_Comparison_AsperaWP.pdf.
Dodson, A., "Channel in a Box, Cloud, Clyde Smith, Fox, Playout"; TVNewsCheck; Cloud, Master Control/ Automation; posted Apr. 7, 2013.
Kurz, P., "World Cup Second-Screen Coverage Achieves Glitch-Free Success"; TVNewsCheck; IP Delivery, Second Screen, Storage and tagged Aspera, Elemental, EVS, FASP; posted Oct. 31, 2014.
Extended European Search Report dated Jun. 29, 2018 for European Patent Application No. 15864742.0.

* cited by examiner

LOCATION AGNOSTIC MEDIA CONTROL ROOM/BROADCAST FACILITY

CROSS REFERENCE TO RELATED APPLICATIONS

This application is a National Stage of International Application No. PCT/US15/063821, entitled "LOCATION AGNOSTIC MEDIA CONTROL ROOM/BROADCAST FACILITY," by Joseph P. Coffaro, filed Dec. 3, 2015, which application claims benefit of the following U.S. Provisional Patent Application:

U.S. Provisional Patent Application No. 62/087,188, entitled "LOCATION AGNOSTIC MEDIA CONTROL ROOM/BROADCAST FACILITY," by Joseph P. Coffaro, filed Dec. 3, 2014;

all of which applications are hereby incorporated herein.

1. FIELD OF THE INVENTION

The present invention relates to systems and methods for disseminating video information and in particular to a system and method for automatically generating a broadcast video stream from at least a live feed in real or near real time.

2. DESCRIPTION OF THE RELATED ART

The dissemination of media programs via cable, satellite, terrestrial broadcast, or Internet transmission is well known. Further, systems have developed which allow virtually anyone to "publish" videos for public consumption via the Internet. Such systems include those employed by YOU TUBE and VIMEO. However, such videos are not transmitted live.

Live broadcasts, whether via cable, satellite, terrestrial broadcast or Internet transmission are also known. However, the transmission of such live broadcasts requires a significant up-front investment of resources to assemble the broadcast stream from the live video streams. Such resources are needed to perform frame synchronization, level controlling, noise reduction, conversion and coding of the live streams and other processing to assemble the broadcast stream from the processed live video stream and other video components (which may include advertisements, on-screen text, logos, and the like). Further, if still further video components are to be added (e.g. advertisements inserted by local broadcasters), cueing messages (for example, those compliant with SCTE 35 or SCTE 104) must be inserted. Currently, the transmission of such live broadcasts cannot be quickly, easily, or inexpensively accomplished, and this limits the realm of live streams that are commercially viable to provide to viewers.

For example, a high school football playoff game may be of intense interest to some viewers, but such viewers are small in number, and hence not worth the investment in time or capital to arrange for its broadcast by traditional means. However, if such broadcast could be made inexpensively or with enhanced monetization options, the live broadcast may become economically feasible. Other examples may include a video of a family reunion or other activity of great interest, but only to a limited set of persons.

Also, some live events may be of intense interest to a large number of people, but only for a short period of time. For example, current events may make one live broadcast of particular interest in the short term, but of little interest mere weeks or months later. If the time needed to arrange for such live broadcasts is in the order of weeks or months, the opportunity broadcast the live event (and to derive monetary gain from the broadcast) can be lost.

As described above, due to their custom, purpose built and hardware-oriented architectures, traditional broadcast infrastructures are ill-suited for use in the distribution of media content that has a limited audience or limited market life. Leveraging infrastructure elements such as cloud storage and/or processing and the use of video stream source-configurable software elements and appropriate in-band signaling, allows for the opportunity to distribute live events both quickly and inexpensively, providing the agility to provide live broadcasts to limited audiences without the overhead and support burdens of traditional architectures. Since the infrastructure elements are agile and remotely disposed from the source of the video feed, the system can be said to be location-agnostic (e.g. the location of the video feed is not a significant factor in the production and assembly of the video program).

The location-agnostic, agile method and software apparatus that is described below provides an implementation of such abstraction and provides an automated and scalable conversion of live video feeds into broadcast video streams for distribution and unique graphic treatment with advertisement and promotion insertion (preferably with monetizing content such as advertising).

SUMMARY OF THE INVENTION

To address the requirements described above, the present invention discloses a method and apparatus for generating a broadcast video stream from a live feed from a source remote from the virtual media control system in at least near real time. In one embodiment, the apparatus is evidenced by a virtual media control system comprising a communication interface, for accepting first control information, the first control information specifying a desired constitution of the broadcast video stream, and for receiving the live video feed from the source via a first communication channel; a stream processor, comprising at least one pre-processor, for pre-processing the one or more video components according to pre-processing commands, a stream switcher for temporally switching between the one or more pre-processed video components to assemble a switched video stream having the video feed other of the one or more video components according to stream switching commands, and one or more post-processors, for post-processing the switched video stream according to post-processing commands to produce the broadcast stream. The virtual media control system also comprises a parser, for parsing the live video feed for second control information comprising live queuing information, and a command module, for interpreting the first control information and the second control information to generate the pre-processing commands, the stream switching commands, and the post-processing commands including the broadcast video stream parameters. The first control information may comprise a manifest describing one or more video components, wherein the one or more video components includes a primary video component comprising the live video feed, and a playlist, describing a temporal assembly of the one or more video components that together compose at least a portion of the generated broadcast video stream. The first control information may also comprise broadcast video stream parameters, comprising at least one of a desired broadcast stream quality of service (QoS) and a destination broadcast network for transmitting the broadcast video stream.

In another embodiment, the method is evidenced by a method comprising accepting first control information in a virtual media control system, the first control information specifying a desired constitution of the broadcast video stream, accepting the live video feed in the virtual media control system from the source via the first communication channel; accepting second control information comprising live queuing information; and automatically processing the live video feed according to the first control information and the second control information to generate the broadcast video stream.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Exemplary Video Dissemination System

Figure 1A:
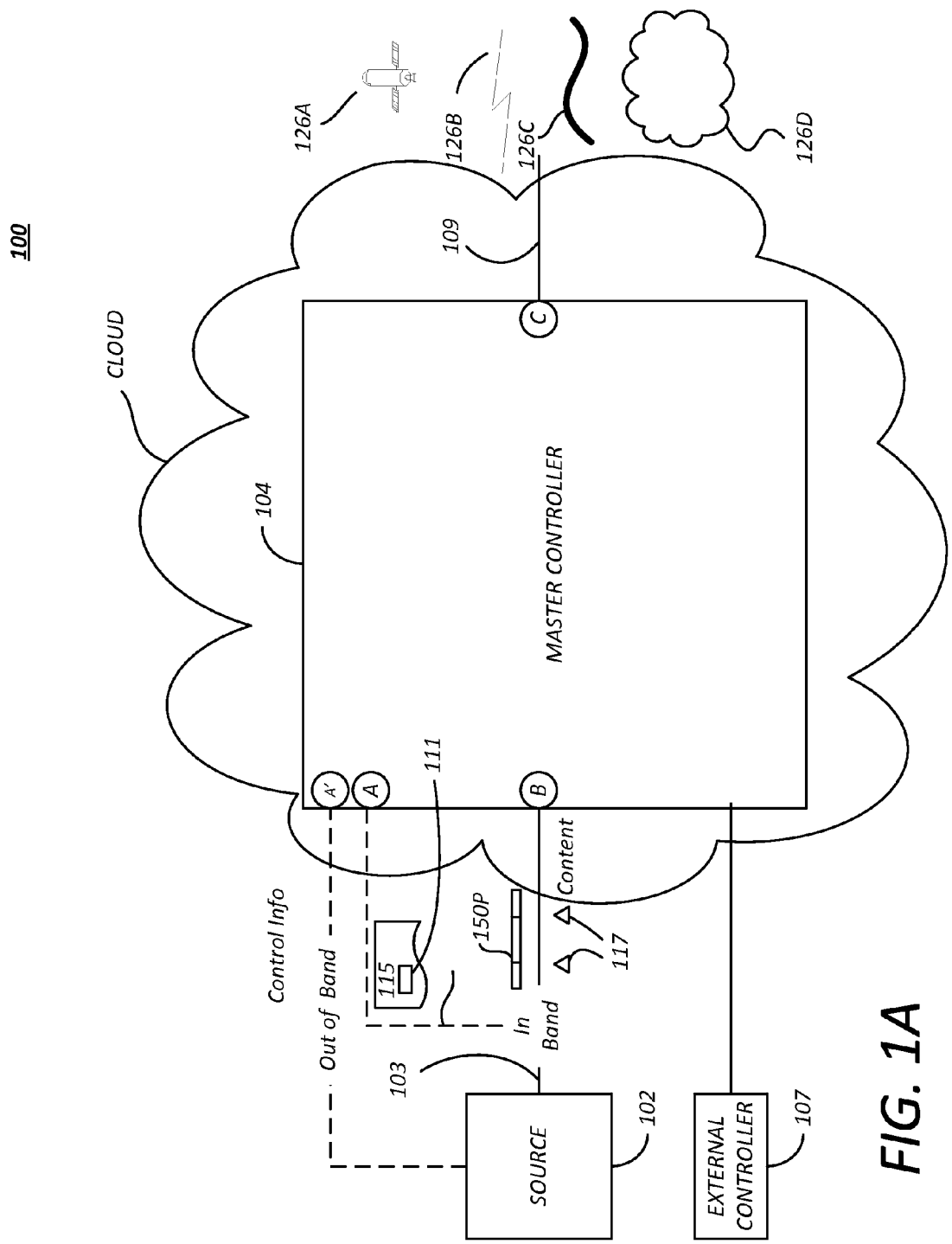
FIGS. 1A and 1B are diagrams of an exemplary live video dissemination system.
Figure 1B:
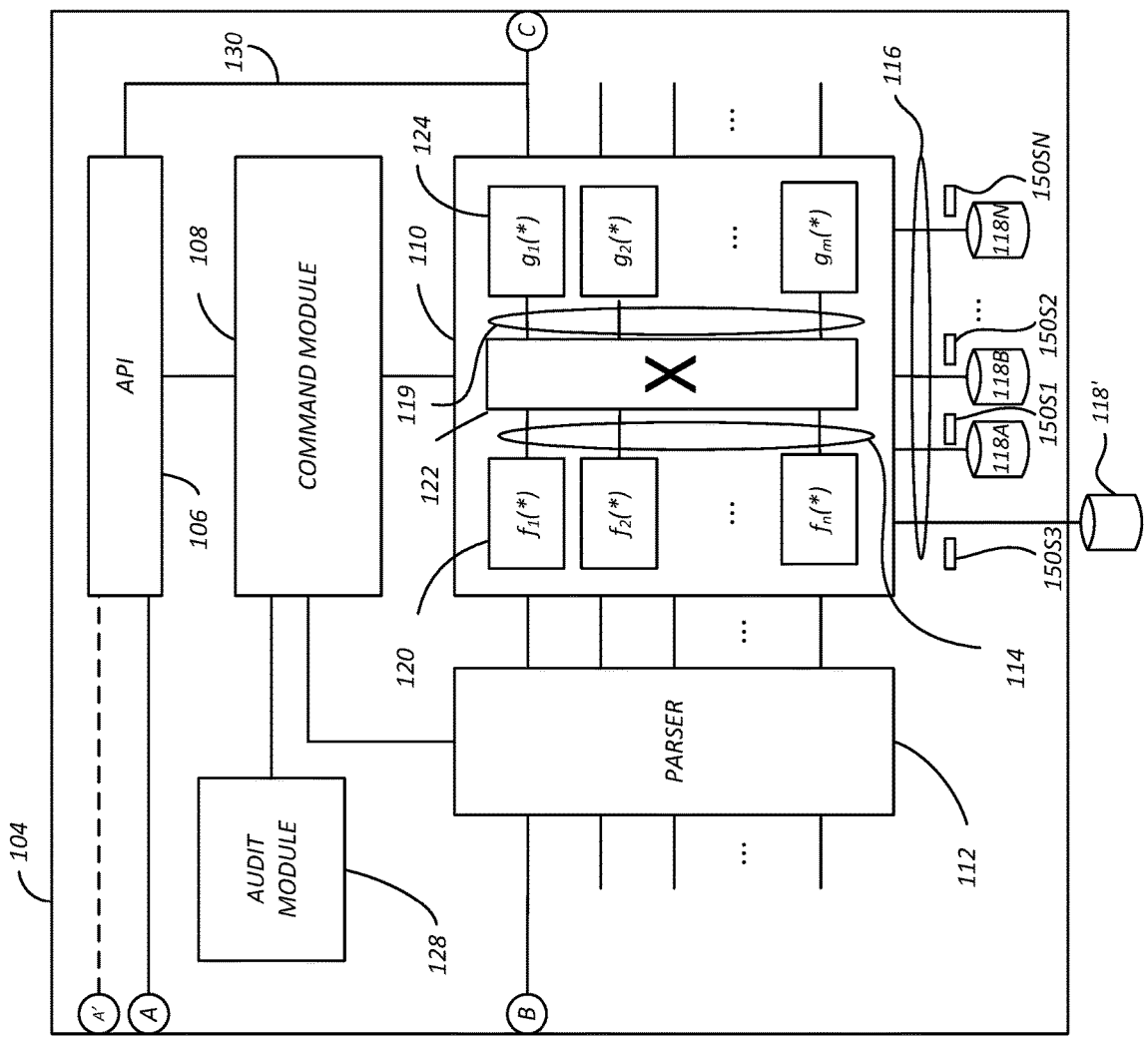

FIGS. 1A and 1B are diagrams of an exemplary live video dissemination system 100 (LVDS). The LVDS 100 comprises a live video source 102 which provides the live video stream 103 and a master controller 104, which receives the live video stream 103, automatically processes it according to instructions provided by the source 102, the master controller 104, and or an external controller 107 to produce a broadcast video stream, then provides the broadcast video stream for broadcast.

The live video source 102 may take many forms. For example, the live video source 102 may be a tablet computer or smartphone having video recording capability, a consumer-quality video camera, a professional quality video camera, or any other device capable of recording live video and transmitting that live video at suitable rates and of suitable quality. In one embodiment, the live video source 102 is communicatively coupled to the master controller 104 via the Internet, however, other communication media can be utilized. The media used to communicatively couple the live video source 102 and the master controller 104 preferably provides the live video and the control information described below at a rate and quality suitable for broadcast purposes, without interruption, and with the data presented in a guaranteed sequence order such as the same order as transmitted. In one embodiment, this may be provided by the ASPERA FAST High Speed Transport, as described in the Appendix of U.S. Provisional Patent Application No. 62/087,188, entitled "LOCATION AGNOSTIC MEDIA CONTROL ROOM/BROADCAST FACILITY," by Joseph P. Coffaro, filed Dec. 3, 2014, which is hereby incorporated by reference.

In one embodiment, the live video stream 103 comprises a primary video component 150P having video content. Further, first control information 115 may be transmitted in-band (e.g. using the same communication channel) along with the primary video component 150P.

The live video source 102 provides the first control information 115 to the master controller 104, and this first control information 115 is used by the master controller 104 to process the live video stream 103 and generate the broadcast video stream 109. The first control information 115, specifies how the broadcast video stream 109 is to be constructed from the primary video component 150P of the live video feed and other (e.g. secondary) video components 150S, if any.

As described further below, the first control information 115 may include (1) information identifying the secondary video components 150S that are to be added to the primary video component 150P of the live video feed 103 to produce the broadcast video stream 109, (2) the temporal location within the broadcast video stream 109 (e.g. which frames of video) each of the secondary video components 150S are to be added to the primary video component 150P of the live video feed 113, (3) the spatial location (e.g. location within each frame) in which the secondary video components 150S are to be added to the primary video component 150P of the live video feed 113 to produce the broadcast video stream 109, and (4) desired characteristics or parameters of the resulting broadcast video stream 109. Second control information 117 may also be provided, and may be provided in-band (e.g. using the same communication channel as the live video feed) or in the live video feed 103 itself, for example, by inserting flags or headers in a digital video stream of the live video feed 103.

In one embodiment, this second control information 117 comprises control information that cannot be transmitted to the master controller 104 apriori (e.g. before creation of the broadcast video stream 109). This second control information 117 may comprise, for example, live video events, because the timing of such events is not known apriori). For example, while transmitting the live video feed, an operator of the video source 102 may select a button or other control to indicate that secondary content 150S (e.g. an advertisement or station identification) may be inserted at the indicated temporal location in the live video feed 103 indicated by the time the button is pushed. The selection of that control may place a flag or other information in the live video stream 103 that the master controller 104 may read and use to indicate a that one of the secondary video components 150S is to be inserted at that time. For example, an operator of the live video source 102 transmitting a primary video component 150P having a football game may note that a time out has been called, and activate a control to insert the live queuing information 117 within the live video feed 103. This information can be inserted between frames, or within a frame temporally proximate the time when the control was activated. This can be accomplished, for example, by inserting a flag or other information within the vertical blanking interval (VBI) of the live video feed or inserting or embedding user data into an MPEG-compliant video stream, for example, in the closed captioning or the active format descriptor. Such data could be inserted at a picture level, a group of pictures (GOP) level, or a sequence level. Steganographic techniques can also be used to insert live queuing information 117 into the live video feed 103.

In one embodiment, the first control information 115 includes a manifest 111 having a content list that identifies the one or more other video components 150 (which may be images, video, or audio) that are to be included with the broadcast video stream 109 and a playlist describing a desired temporal and/or spatial assembly of those one or more other video components 150 to compose the generated broadcast video stream 109.

For example, the manifest 111 may indicate that the broadcast video stream 109 is to comprise the primary video component 150P (the content of the live video feed 103), as well as one or more secondary video components 150S, inserted at specified temporal and or spatial locations within the primary video component 150P. In particular, the secondary video components 150S may include advertisements selected for inclusion into the broadcast video stream 109. Such selection is ultimately preformed by the master controller 104 as described further below, but in performing this operation, the master controller 104 may use commands and other input from the live video source 102 or a third entity.

Figure 2A:
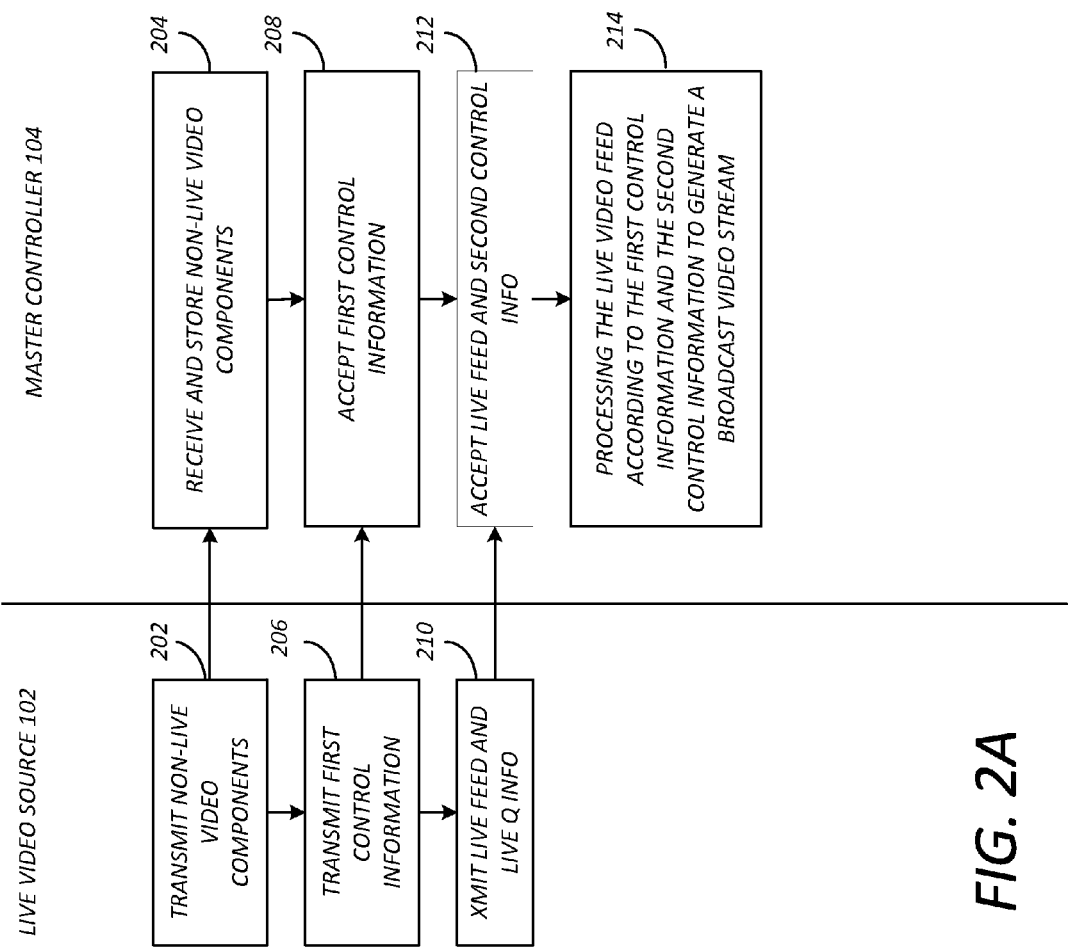
FIGS. 2A and 2B are diagrams of exemplary method steps that can be used to generate a broadcast video stream from a live feed.
Figure 2B:
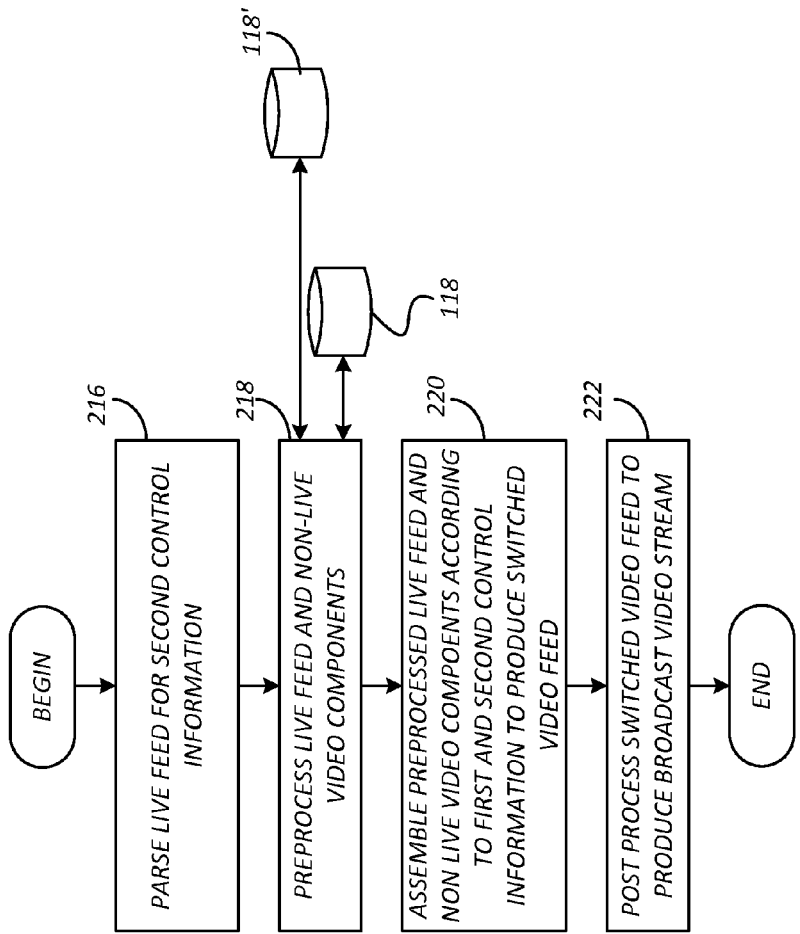

FIGS. 2A and 2B are diagrams of exemplary method steps that can be used to generate a broadcast video stream 109 from a live feed 103. Video components 150 may be further categorized as live video components 150 and non-live video components 150. Live video components 150 are typically streamed from the video source 102 in real time (e.g. as the events occur), and may include multiple camera angles of the same event. Non-live video 150 components are typically transmitted to the master controller 104 apriori, that is, in advance of its inclusion into the broadcast video stream 109, but may also be streamed from the video source 102 for inclusion in real time. Such non-live video components can include, for example, advertisements, logos, text, overlays, or any non-live video component that can be provided to the master controller apriori.

In block 202, non-live video components 150 are transmitted to the master controller 104. In block 204, the master controller 104 receives the non-live video components 150 and provides for their storage for later use. Such storage may be within the master controller 104 facility itself (e.g. by one or more of storage devices 118A-118N), but also may comprise off-line storage 118' such as cloud storage at another location. The secondary video components 150S1, 150S2, 150S3 . . . 150SN retrieved from such storage 118A, 118B, 118C, . . . , 118N can be used to generate non-live video feeds 116.

Video components 150 that will be included within the broadcast video stream 109 can be received from sources other than the live video source 102. For example, video components 150 may be provided by a third party video component 150 source such as advertiser or advertising agency. Video components 150 may also be provided to the master controller 104 simply by providing a uniform resource locator (URL) or other global address from which the master controller 104 may obtain the video components 150.

As will be further discussed below, the video components 150 provided to the master controller 104 may be video components 150 that must be included in the broadcast video stream 109 (e.g. mandated by the video source 102) or components that simply may be included in the broadcast video stream 109 at the discretion of the master controller 104.

For example, in one embodiment, the live video source 102 provides only the live video content, and the master controller 104 selects the secondary video components 150S (e.g. advertisements) to be included in the broadcast video stream 109. In this embodiment, the live video source 102 may be charged a fee for broadcasting the live video feed 103, with that fee offset by fees collected from advertisers for advertising that the master controller 104 inserts into the broadcast video stream 109.

Or, in another embodiment, the live video source 102 may provide both the live video content 150 as well as the other video components 150 to the master controller 104, and the master controller 104 charges a fee for the assembly of the broadcast video stream 109. In this case, the live video source 102 may collect advertisement fees from advertisers to offset the cost of assembling the broadcast video stream 109.

In block 206, the live video source 102 transmits first control information 115 to the master controller 104. In block 208, the master controller 104 receives and stores the first control information 115.

Figure 3:
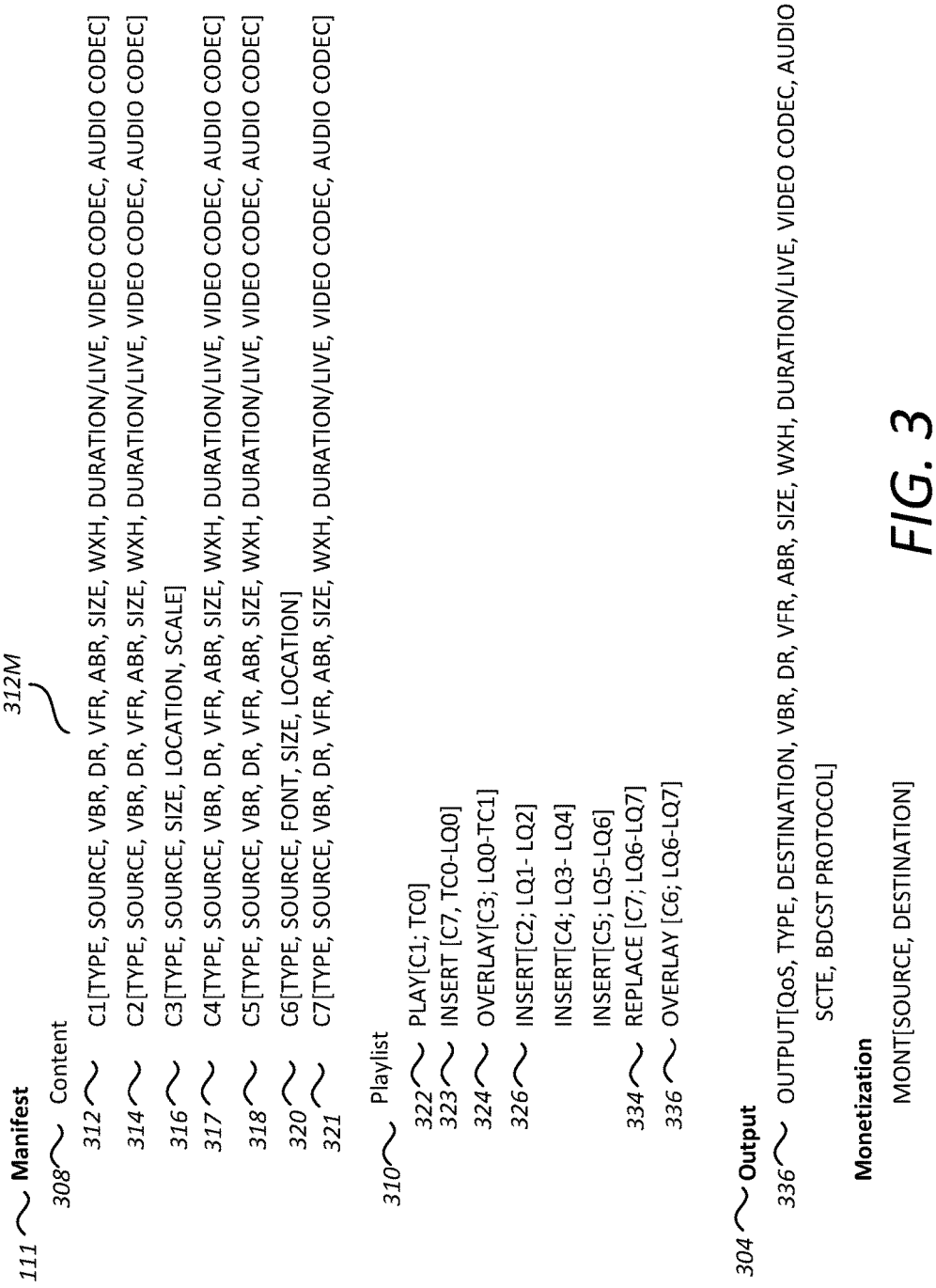
FIG. 3 is a diagram illustrating an exemplary embodiment of first control information.

FIG. 3 is a diagram illustrating an exemplary embodiment of first control information 115. The first control information 115 comprises, for example, a manifest 111 having a content description 308, and a playlist 310. The content description 308 includes a description of each video component 150 to be included in the broadcast video stream 109, and the playlist 310 includes a description of where and how the secondary video components 150S are to be included with the primary video component 150P to create the broadcast video stream 109.

In the illustrated embodiment, the content description 308 comprises a content descriptor 312-321 for each video component 150. In the embodiment illustrated in FIG. 3, each video component 150 is denoted as C1, C2, . . . , C6 and the characteristics of the video component 150 are indicated with the brackets. For example, the primary video component C1 150P is described by content descriptor 312, which includes metadata 312M describing the primary component C1 150P. Exemplary metadata describing the primary video component C1 150P and similar components may include the information listed in Table I below:

TABLE I

| Parameter | Examples |
| --- | --- |
| File Type | mpg, avi, ps |
| Video Source | URL |
| | C:/ |
| Video Bit Rate (bits/sec) | 1M |
| Audio Bit Rate (bits/sec) | 100K |
| Data Rate (bits/sec) | 2M |
| Video Frame Rate (fps) | 30 |
| Size (bits) | 10.1M |
| Resolution (pixels) | 1920 × 1080 |
| | 1080p |
| Duration (hours:minutes:sec) | 0:30:00 |
| | Live |
| Video Coding | MPG, H.264, HEVC |
| Audio Coding | PDM, LPCM, PAM |

File Type:

The file type describes the file type or format of the video component 150. The file type or format may be indicated by a filename extension (*.extension) consisting of three characters that computer operating systems use to determine how to read and process the file. For video components, such file extensions include, for example, *.mpg, *.avi, and *.fla. Other file type or format identification means can be used including internal metadata such as a file header, a "magic number" such as used in UNIX, or external data such as Mac OS type-codes, Uniform Type Identifiers, OS/2 Extended attributes, PRONOM Unique identifiers or PUIDs, MIMI types, file format identifiers or file content based format identification.

Video Source:

The video source parameter describes the source 102 of the video component 150, and may comprise a video source identifier that is inherent to the video source 102 (e.g. a serial number), an alphanumeric identifier chosen by the operator of the video source 102, or may comprise one or more alphanumeric characters assigned by the master controller 104 to the video source 102 of the associated video component 150.

Video Bit Rate:

The video bit rate and audio bit rate describe the bit rate of the video component 150 and associated audio components (if not integrated with the video component), respectively, as they are transmitted to the master controller 104. This parameter is primarily of use for live streams. The data rate describes the rate of auxiliary data that may be inserted into the broadcast video stream 109.

Video Frame Rate:

The video frame rate describes the number of video frames per second of the video component 150. This information is used by the master controller 104 for the processing of the video component 150. For example, if a primary video component 150P has a particular frame rate (e.g. 30 fps) and the secondary video component 150S to be assembled into the broadcast video stream 109 has a different frame rates (e.g. 35 fps), the master controller 104 may preprocess either the primary video component 150P or the secondary video component 150S so as to render all of the video components 150 at the same frame rate before assembly into the broadcast video stream 109. This may be accomplished by transcoding the primary video component 150P into a frame rate of the secondary video component 150S, or transcoding the secondary video components 150S to match the frame rate of the primary video component 150P, or transcoding both the primary video component 150P and the secondary video component 150S to a third frame rate.

Size:

The size parameter provides the size of the video component 150. If the video component 150 is a live feed, the size parameter may reflect a maximum or minimum expected size of the file, or may simply include a character indicating that the file size is unknown.

Resolution:

The resolution parameter provides the resolution of the frames of the video component 150, which may be expressed in vertical and horizontal pixels (e.g. 1920×1080), or other expressions. For example, the resolution parameter may be represented by 1080p, indicating that the resolution is 1920×1080 pixels and progressively scanned or 1080i, indicating that the resolution is 1920×1080 pixels and interlaced.

Duration:

The duration parameter describes the duration of the video component 150 in time. Again, if a live feed is used, a default value or one that represents minimum or maximum duration may be used.

Video and Audio Coding:

Finally, the video coding and audio coding parameters indicate which video and audio coding formats were used to encode the video component 150.

Other video component 150 types may have different parameters. For example, video component C3 150 may be a secondary video component 150S describing an image that is to be placed on one or more frames of the broadcast video stream 109. Parameters for this video component 150S include the file type or format of the image (e.g. *.jpg, *.gif, *.png), the source of the image or graphic (which may be a file location on a computer system or a URL), the size (in bits) of the video component 150S, the location within the frames of the broadcast video stream 109 that the image is to be placed, and the scale of the video component 150S. For example, if video component 150S is a *.jpg file of a logo of the video source 102 or other graphic, placed in the lower right hand corner of one or more frames of the broadcast video stream 109 and scaled to be 1/10 of the size of the video frame, the parameters my be [jpg, K:/files/video component, LR, 0.1]

As another example, the video component C6 may be a secondary video component 150S that comprises text, and the parameters associated with the text may include the file type, the source of the file, the font used to present the text and the size of the text and the location it is to be presented in the frame(s).

The playlist 310 comprises play parameters for each of the video components 150. Playlist descriptors may describe what video components 150 should be included in the broadcast video stream 109 and when. When a particular video component 150 should be included in the broadcast video stream 109 may be specified by a live queuing event 117 (depicted as LQn in FIG. 3) or an apriori queuing event (depicted as TCn in FIG. 3) queued to a global clock or other reference.

The playlist descriptor 322 depicted in FIG. 3 indicates that video component C1 150P should be played, beginning at the point where live queuing event LQ0 is received. An ending time for the inclusion of component C1 may also be indicated.

Playlist insert descriptor 323 indicates that secondary video component 150S (C7) should be inserted in place of the primary video component 150P (C1) between apriori time TC0 and live queuing event time LQ0.

Playlist overlay descriptor 324 indicates that video component C3 should be overlaid on component C1 from the time the live queuing event LQ0 is received until the time apriori queuing event TC1 occurs. If video component C1 is a live feed component, TC1 may take a value (e.g. 9999) that indicates that video component C3 should be overlaid on video component C1 for the total length of video component C1. Alternatively, the playlist overlay descriptor 324 may specify a live event queuing time.

Playlist insert descriptor 326 indicates that secondary video component C2 150S should be inserted into the broadcast video stream 109 in place of video component C1 150P from live queuing time LQ1 to live queuing time LQ2. As described above, live video components 150 are different than non-live video components 150 in that events that may signal insertion of another video component 150 may occur in live video components 150 at unpredictable times. For example, the live event may be a high school football game, and the event may be a time-out. The timing of the time-out cannot be determined in advance, so it must be indicated during the transmission of the live stream itself (e.g. by an operator of the video source 102) selecting a control when the time out is taken. This live queuing event 117 is preferably transmitted in-band with the live video stream 103 and may be transmitted in the video stream 103 itself by appending data or flags to signaling information within the stream. Alternatively, the live queuing event 117 may be transmitted independent of the live video stream.

For example, consider an embodiment in which the first live queuing event 117 is transmitted in the live video stream as live queuing event LQ1. The playlist 310 depicted in FIG. 3 indicates that video component C2 150S is to be inserted for video component C1 beginning at the time that the live queuing event LQ1 appears in the live video stream. Video component C2 150S continues to play until it completes or until a second live queuing event LQ2 is appears in the live video stream.

Likewise, the playlist 310 shown in FIG. 3 indicates that video component C4 150S should be substituted for component C1 150P beginning when live queuing event LQ3 appears in the live video stream and continues to play until it competes or until live queuing event LQ4 appears in the live video stream 103. Playlist 310 also indicates that video component C5 should be substituted for the primary video component 150P (C1) from times LQ5 through LQ6.

The playlist 310 may also indicate that that a video component should replace the originally played video component. A playlist REPLACE descriptor 334 may include a replace statement indicating that another video component C7 should replace component C1 at the time indicated by live queuing event LQ7, and become the primary video component 150P. Video component C7 may be a live feed depicting an entirely different live event, or may be the same live event depicted by (the previously primary) video component C1, but by a different video source 102 (e.g. a different camera providing a different camera angle).

Playlist overlay descriptor 326 indicates that video component C6 should be overlaid over the primary video component from times associated with LQ6-LQ7. For example, video component C6 may be a text file that indicates that a different camera view is being depicted.

Although the foregoing describes live queuing events of only one type, in another embodiment, live queuing events 117 may also be of different types, to signal different changes in the broadcast video stream 109. For example, a live queuing event of one type (such as LA1-LQ4) may indicate that switching to a pre-recorded video component such as an advertisement (e.g. at a time out), while a live queuing event of another type (such as LAA-LAB) may be used to indicate a switch from one live video source 102 to another live video source 102 (e.g. another camera covering the same live event).

Finally, it is envisioned that playlist descriptors be included that specify that another secondary video component 150S (for example, designated by CH), chosen by the master controller 104, may be inserted between times particular times. Such an insert descriptor may take the form of "INSERT[CH; LQ7-LQ8]. This secondary video component 150S (CH) may be an advertisement selected at the discretion of the master controller 104, subject to restrictions provided by the video source 102. In one embodiment, the video source 102 may indicate that the advertisement or other video component permitted to be inserted must comply with a G (general) rating, indicating it must be suitable for audiences of all ages, for example, as follows: INSERT[CH; PG; LQ7-LQ8]. The manifest 111 may also describe digital video effects between selected components such as fading in or out.

First control information 115 also may include at least one output descriptor 336 for specifying the characteristics of the output 304 of the broadcast video stream 109. In the illustrated embodiment, the characteristics include those illustrated in Table II below:

TABLE II

| Parameter | Examples |
| --- | --- |
| QoS | 1-10 |
| File Type | mpg, avi, ps |
| Destination | URL |
|  | C:/ |
| Video Bit Rate (bits/sec) | 1M |
| Audio Bit Rate (bits/sec) | 100K |
| Data Rate (bits/sec) | 2M |
| Video Frame Rate (fps) | 30 |
| Size (bits) | 10.1M |
| Resolution (pixels) | 1920 × 1080 |
|  | 1080p |
| Duration (hours:minutes:sec) | 0:30:00 |
|  | live |
| Video Coding | MPG, H.264, HEVC |
| Audio Coding | PDM, LPCM, PAM |
| SCTE | Splice Insert, cue-in/cue-out |
| BDCST PROTOCOL | NTSC |

Note that the description of the output broadcast video stream 109 is similar to that of the input video components, but includes a quality of service (QoS) parameter, an SCTE parameter, and a Broadcast Protocol parameter. The QoS parameter indicates a desired quality of service for the output broadcast video stream 109. The SCTE parameter indicates where Society of Cable Telecommunications Engineers (SCTE) codes (e.g. those compliant with SCTE 35 or SCTE 104) may be inserted to indicate temporal locations in the broadcast video stream 109 where downstream advertisements or other video components may be inserted.

In one embodiment, the master controller 104 comprises an interface/application program interface (API) 106 (hereinafter, API 106). The API 106 comprises a communication interface with the video source 102 to assist in the generation of the first control information 115, including the manifest 111. In one embodiment, the API 106 accepts the first control information 115 from the video source 102. In another embodiment, the API 106 is used cooperatively by the video source to generate the first control information 115 from user commands.

For example, the user of the video source 102 may indicate that they desire to broadcast a video component 150, and be presented with an interface prompting the user to specify whether the video component 150 is the primary video component 150P or a secondary video component 150S, then prompt the user to enter the parameters associated with that component type. The user may then be prompted to enter all other (primary and secondary) video components 150 of interest, with prompts for the same or similar information. The user may be then prompted to enter the playlist 310 information, indicating which of the video components 150 are to be part of the broadcast video stream 109 at the selected times. In one embodiment, this may be accomplished by presenting the user (e.g. via data transmitted from the API 106 received and presented by the video source 102 or auxiliary equipment) with a timeline similar to the timeline illustrated in FIG. 4. The user may then select visual representations of each desired secondary video component 150S using a graphical user interface or GUI, and move those selections within a timeline representation of the primary video component 150P Live queueing events 117 may also be indicated in the timeline fashion illustrated in FIG. 4, with each annunciating triangle for live queueing event 117 filled in when the user selects a control indicating that a live queueing event has occurred. Of course, the user may also simply generate the first control information 115 illustrated in FIG. 3 by simple textual entry.

Returning to FIG. 2A, the video source 102 transmits the primary video component 150P (e.g. the live feed) to the master controller 104, as shown in block 210. Typically, the live video stream 103 as well as other video components 150 comprise a plurality of data packets. A video data file or stream typically comprises a container of a particular format having packets of video data in a video coding format and packets of audio data in an audio coding format. The container provides synchronization information, subtitles, and other metadata.

The live feed may also comprise live queuing information such as one or more live queuing events. In block 212, the master controller 104 receives and processes the received primary video component (live video feed) and live queuing information, as shown in block 214.

FIG. 2B is a diagram illustrating one embodiment of the processing of the video components 150 according to the first control information and second control information. The command module 108 receives the first control information 115 from the API 106 and interprets the first control information 115 to generate pre-processor 120 commands, stream switcher 122 commands, and post-processor 124 commands.

In block 216, the live video feed 103 is received and is parsed for second control information 117. This may be accomplished by parser 112, which parses the incoming live video feed 103 to identify the second control information 117 and provide it to the command module 118. The command module 108 commands the stream processor 110 to process the video components 150 as described in the first control information 115 and the second control information 117.

This processing may include one or more of (1) preprocessing video components 150 (including the primary video component 150P of the live feed 103 and secondary video components 150S, if any) as shown in block 218, (2) assembling the preprocessed video components 150 to produce an assembled video feed, as shown in block 220, and (3) post processing the assembled video feed to produce the broadcast video stream 109, as described in block 222.

The preprocessing of the video components 150 can be accomplished by using one or more of preprocessors 120. Preprocessors 120 may operate in parallel to preprocess the same or different video components 150 at the same time, or may operate in series to further preprocess video components 150 that have already been pre-processed by another pre-processor 120. For example, the embodiment illustrated in FIG. 1B includes preprocessors $f_1(\bullet), f_2(\bullet), \ldots, f_n(\bullet)$ 120. These preprocessors 120 can be used to perform pre-processing in parallel (e.g. $f(\bullet)=f_1(\text{video component}_1)+f_2(\text{video component}_1)$) or in series (e.g. $f(\bullet)=f_1(f_2(\text{video component}_1))$) or any combination thereof. One example of preprocessing would be to preprocess the primary video component 150P and the secondary video component 150S to transcode those components from their native formats to a format suitable for assembly and potential post processing to generate the broadcast video stream 109. For example, the primary video component 150P may be transcoded from a 32 fps 1080i video (as described, for example, in the content descriptor 308 of the manifest 111 associated with the primary video component 150P) into a 30 fps 1080p video (as described, for example, in the output descriptor 336 of the first control information 115), and the secondary video component 150S may be pre-processed to transcode it from a 60 fps 720p video (as described in the content descriptor of the manifest 111 associated with the secondary video component 150S) into a 30 fps 1080p video (also as described in the output descriptor 336) so that switching from the primary video component 150P to the secondary video component 150S be glitch free.

The assembly of the optionally preprocessed video components 114 can be accomplished by using stream switcher 122, again under control of the command module 108. The stream switcher 122 switches from among the optionally preprocessed video components 114 according to commands from the command module 108, thereby substituting one of the preprocessed video components 114 for another to generate one or more switched video components 119. In one embodiment, the stream processor 110 comprises a system such as the SNELL ICE described in U.S. Provisional Patent Application No. 62/087,188, entitled "LOCATION AGNOSTIC MEDIA CONTROL ROOM/BROADCAST FACILITY," by Joseph P. Coffaro, filed Dec. 3, 2014, which application is hereby incorporated by reference herein.

Switched video components 119 can be post processed by post-processors 124. Similar to the pre-processors 120, the post-processors 124 may operate in parallel to post process the same or different switched video components 119 at the same time, or my operate in series to further process switched video components 119 that have already been post processed by another post-processor. For example, post-processors 124 may be used to perform pre-processing in parallel (e.g. $g(\bullet)=g_1(\text{switched video component}_1)+g_2(\text{switched video component}_1)$) or in series (e.g. $g(\bullet)=g_1(g_2(\text{switched video component}_1))$) or any combination thereof. While video components 150 may be preprocessed to place them in a format suitable for their assembly by the stream switcher 122, that format may not be suitable for the broadcast video stream 109. For example, the one or more post-processors 124 may transcode or otherwise process the switched video components 119 to place the switched video components into a format suitable for broadcast. The post-processors 124 may also post process the switched video components 119 to eliminate or reduce glitches that may occur during switches from one video component 150 to another, to enhance the quality of the resultant video, to band limit the resulting video stream to assure shudder-free transmission, or to add additional information to the switched video components 119 such as SCTE 35 queuing information for advertisements inserted downstream of the master controller 104, or logos that will be used across all video components 150.

In one embodiment, the post processors 124 comprise a downstream keyer (DSK) for superimposing graphics on one or more portions of the switched video stream obtained from the stream switcher 122.

The resulting output of the stream processor 110 is the broadcast video stream, which is provided to broadcast entities 126 such as satellite broadcast system 126A, terrestrial broadcast system 126B, cable broadcast system 126C or Internet-based broadcast system 126D.

Figure 4:
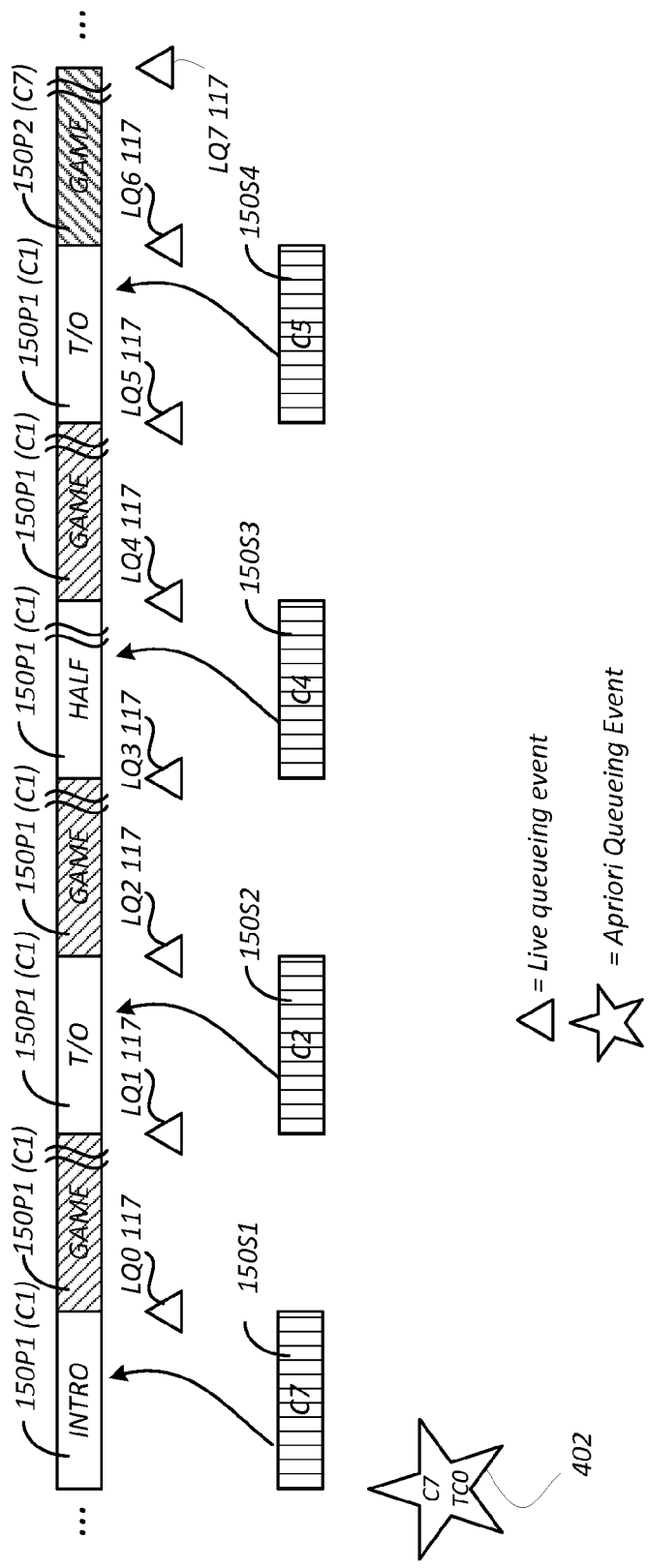
FIG. 4 is a diagram illustrating an exemplary embodiment of how the master controller may process the primary video component and live queuing information.

FIG. 4 is a diagram illustrating an exemplary embodiment of how the master controller 104 may process the primary video component 150P and live queuing information 117. The primary video component 150P in this illustration is denoted as 150P1, and comprises a high school football game described by manifest content descriptor 312. In the illustrated embodiment, the video source 102 may be providing the primary video component 150P1 to the master controller 104 at time TC0, but since the game has not begun, all that is presented in the primary video component 150P1 is scattered random events on the football field. Since this is likely of little interest to viewers of the football game, the video source 102, through the use of appropriate first control information 115, has indicated (via playlist descriptor 323) that master controller 104 should insert a secondary video component 150S1 (C7 in FIG. 3) from time TC0 (indicated by apriori queuing event 402) until such time as live queuing event LQ0 117 is received. This introductory secondary video component 150S1 may comprise, for example, a recording of the highlights of last week's football game. The master controller 104 retrieves this secondary video component 150S1 from storage 118A, and provides the secondary video component 150S1 to the preprocessors 120 for preprocessing, again, as indicated by the first control information 115. For example, the first control information 115 shown in FIG. 3 does not indicate that the secondary video component 150S1 (C7) should include an overlay, however preprocessing may be required to format the secondary video component 150S1 from its native format to one that is suitable for assembly into the broadcast video stream 109. The preprocessing of stored secondary video components such as 150S1 can occur well in advance of the use of the secondary video component in the broadcast video stream 109, or can occur in real time or near real time.

The first control information 115 has indicated that the primary video component 150P1 should be inserted into the broadcast video stream 109 at the time associated with live queuing event LQ0. Hence, when the operator of the video source 102 wants to begin including the primary video component 150P1 in the broadcast data stream 109, the operator may select a control to insert a live queuing event LQ0 117 into the live feed 103. The parser 112 parses the incoming live feed 103 for this live queuing event LQ0, and when it arrives, passes the live queuing event LQ0 to the command module 108, which commands the stream processor 110 to substitute the primary video component 150P1 (C1) into the broadcast data stream 109 for the currently playing secondary video component 150S2 (C7). This can be accomplished, for example, by commanding the stream switcher 122 to switch the switch from the secondary video component 150S1 to the primary video component 150P1 at the time of the live queuing event LQ0.

Using the first control information 115, the command module 108 also recognizes from playlist descriptor 324 that secondary video component 150S2 (C3) (such as a channel logo JPEG) is to be overlaid on the primary video component 150P1 (C1) from live queueing event LQ0 to apriori time TC1, so the command module 108 commands one or more of the pre processors 120 and/or post-processors 124 to overlay secondary video component 150S2 (C3) on the frames of the primary video component 150P1 associated with live queueing event LQ0 and temporally extending to the frame associated with apriori time TC1.

Use of a preprocessor 120 is more appropriate if the overlay is to be inserted only on the primary video component 150P1 and not other video components to be inserted in the broadcast video stream 109. Conversely, use of a post-processor 124 is more appropriate if the overlay is to be inserted on all video components 150 being assembled into the broadcast video stream 109. Such preprocessing or post processing may comprise the use of two preprocessors, one to transform the JPEG into a form suitable for inclusion on frames of video, and another to insert the JPEG itself into the frames. The command module 108 then directs the switched video component 150P1 (C1) to be output as the broadcast video stream.

The operator of the video source 102 continues to view the football game and notes that a time-out (T/O) has been taken by one of the teams. Since this is an appropriate time to insert an advertisement, the operator of the video source 102 may select a control to insert another live queuing event LQ1 117 into the live video feed 103. The parser 112 senses this live queuing event and passes the information to the command module 108.

Using the playlist descriptor 326, the command module 108 recognizes that secondary video component 150S2 (C2) is to be inserted from the time beginning at live queueing event LQ1 until live queueing event LQ2. Accordingly, the command module 108 directs pre-processors 120 to preprocess the secondary video component 150S2 as indicated, and directs the stream switcher 122 to substitute the secondary video component 150S2 for the primary video component 150P1 from time LQ1 to LQ2. The command module 108 also directs the post-processors 124 124 to complete any required post processing to complete the generation of the broadcast video stream 109.

When the operator of the video source 102 observes that the time-out is over, the operator selects a control to insert live queuing event LQ2 into the live video feed 103, thus signaling the end of the period of time in which second video component 150S2 (C2) may be inserted.

As time outs may be of variable length, the command module 108 may command the stream switcher 122 to switch back to the primary video component 150P1 if the live queueing event LQ2 is not received before the secondary video component 150S2 has completed playing, or the command module 108 may simply insert other secondary video components 150S until such time as live queueing event LQ2 is received. However, when live queueing event LQ2 is received, the command module 108 may switch back to the primary video component 150P1, regardless of whether the secondary video component 150S2 has completed playing.

Audit module 128 monitors the command module 108 to determine which video components 150 have been assembled into the broadcast video stream 109 and whether such components were played in their entirety. This information can be used to determine bill advertisers for inserting their secondary video component 150S into the broadcast video stream, as well as to charge the video source 102 for the primary video component 150P assembled into the broadcast video stream.

At some point, the game may enter a halftime. The operator of the video source 102 may then select a control, transmitting live queueing event LQ3 in the live video stream 103. The parser 112, parsing this live video stream 103 again detects the presence of live queueing event LQ3 and transmits this information to the command module 108. The command module generates commands for preprocessors 120 stream switcher 122 and post-processors 124 in accordance with the first control information 115 and the second control information 117 such as the received live queueing events. In accordance with the first control information 115 illustrated in FIG. 3, the command module 108 commands the stream switcher 122 to insert the secondary video component 150S3 (C4) for the primary video component 150P1 beginning at the time associated with live queueing event LQ3. This secondary video component 150S3 may be a single advertisement, or a plurality of advertisements which together approximately span the time interval between live queueing events LQ3 and LQ4. Live queueing event LQ4 signals that the game has resumed, and the command module 108 commands the stream switcher 122 to switch back to primary video component 150P1. Similarly, live queueing event LQ5 indicates that secondary video component 150S4 (C5) should be inserted.

Referring again to the first control information 115 depicted in FIG. 3, playlist descriptor 334 indicates that video component 150P2 (C7) should replace video component 150P1 (C1) as the primary video component 150P when live queueing event LQ6 is received until live event LQ7 is received. Further, playlist descriptor 336 indicates that secondary video component C6 should be overlaid on the video frames during between the same live queueing events. Primary video component 150P2 (C7) may comprise, for example, an alternate camera angle of the football game from a different video source 102, and the secondary video component C6 may comprise text indicating that what is currently presented is a second camera angle.

A REPLACE command was used in the first control information 115 depicted in FIG. 3 to indicate that video component 150P2 (C7) is not presumed to be the primary video component 150P, and that when INSERT commands are have expired, the broadcast video stream 109 is to revert back to the primary video component 150P2 (C7). If it is instead desired that expired INSERT commands cause the broadcast video stream 109 to revert back to the former primary video component 150P1 (C1), an INSERT or PLAY command may instead be used.

It is envisioned that live video sources 102 may be compensated for providing the live video feed 103, may be charged for broadcasting the live video feed 103 as the broadcast video stream, or may share in the revenue or expenses derived from the broadcast of the live video feed and components. Audit module 128 communicates with the command module 108 and/or the interface/API 106 to collect and process information needed to provide an accounting for the revenue and/or expenses derived from the broadcast of the broadcast video stream.

It is further envisioned that the interface/API may monitor the broadcast video stream via connection 130, and provide the monitored broadcast video stream to the live video feed source 102.

Exemplary Hardware Environment

Figure 5:
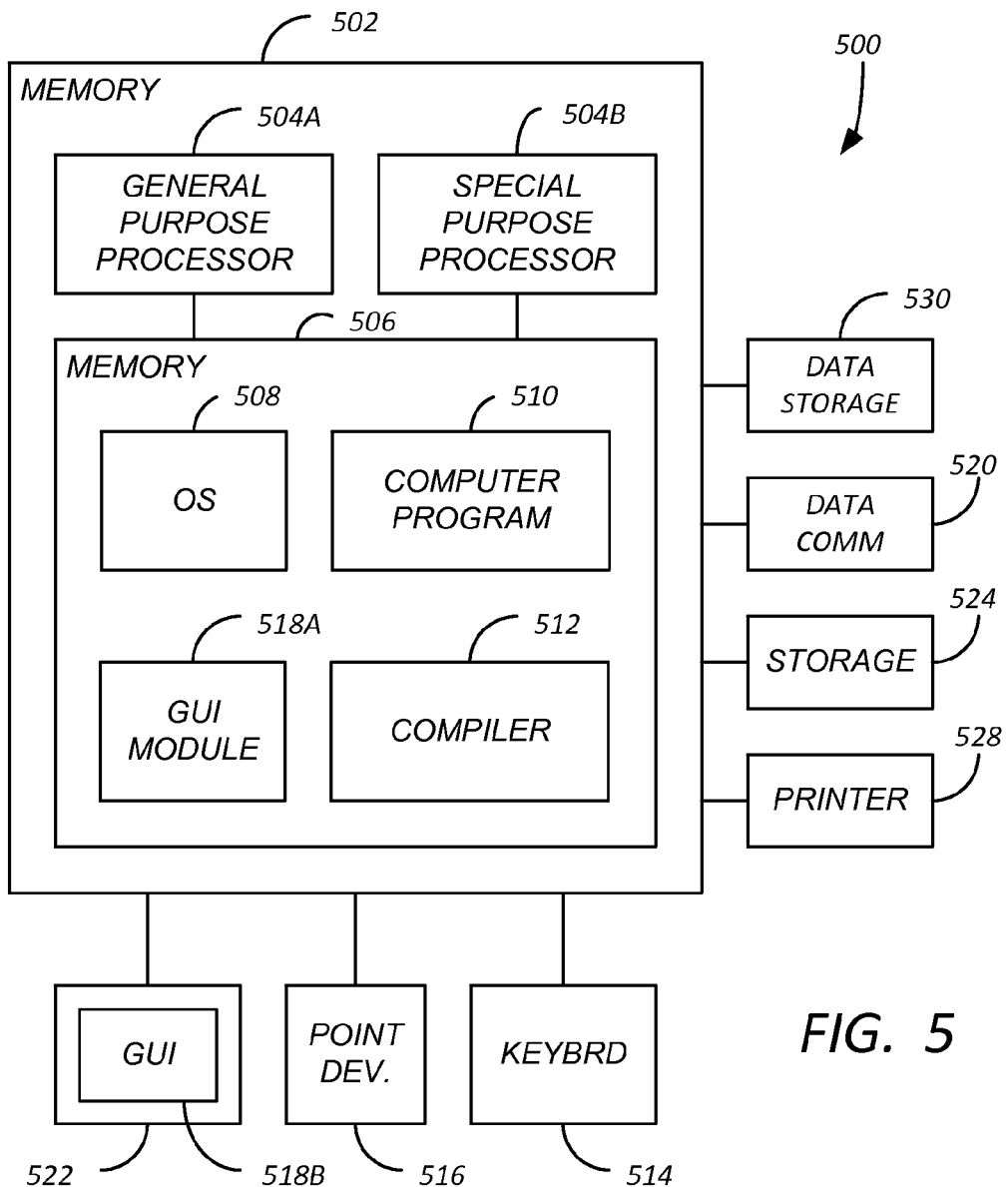
FIG. 5 is a diagram illustrating an exemplary computer system 500 that could be used to implement elements of the video dissemination system and method.

FIG. 5 is a diagram illustrating an exemplary computer system 500 that could be used to implement elements of the present invention. The computer 502 comprises a general purpose hardware processor 504A and/or a special purpose hardware processor 504B (hereinafter alternatively collectively referred to as processor 504) and a memory 506, such as random access memory (RAM). The computer 502 may be coupled to other devices, including input/output (I/O) devices such as a keyboard 514, a mouse device 516 and a printer 528.

In one embodiment, the computer 502 operates by the general purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508 to provide output and results.

Output/results may be presented on the display 522 or provided to another device for presentation or further processing or action. In one embodiment, the display 522 comprises a liquid crystal display (LCD) having a plurality of separately addressable pixels formed by liquid crystals. Each pixel of the display 522 changes to an opaque or translucent state to form a part of the image on the display in response to the data or information generated by the processor 504 from the application of the instructions of the computer program 510 and/or operating system 508 to the input and commands. Other display 522 types also include picture elements that change state in order to create the image presented on the display 522. The image may be provided through a graphical user interface (GUI) module 518A. Although the GUI module 518A is depicted as a separate module, the instructions performing the GUI functions can be resident or distributed in the operating system 508, the computer program 510, or implemented with special purpose memory and processors.

Some or all of the operations performed by the computer 502 according to the computer program 510 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 502 may also implement a compiler 512 which allows an application program 510 written in a programming language such as COBOL, C++, FORTRAN, or other language to be translated into processor 504 readable code. After completion, the application or computer program 510 accesses and manipulates data accepted from I/O devices and stored in the memory 506 of the computer 502 using the relationships and logic that was generated using the compiler 512.

The computer 502 also optionally comprises an external communication device such as a modem, satellite link, Ethernet card, or other device for accepting input from and providing output to other computers.

In one embodiment, instructions implementing the operating system 508, the computer program 510, and/or the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, or a flash drive. Further, the operating system 508 and the computer program 510 are comprised of computer program instructions which, when accessed, read and executed by the computer 502, causes the computer 502 to perform the steps necessary to implement and/or use the present invention or to load the program of instructions into a memory, thus creating a special purpose data structure causing the computer to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 502.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A virtual media control system for generating a broadcast video stream from a live video feed from a source remote from the virtual media control system in at least near real time, comprising:
   a communication interface, for accepting first control information, the first control information specifying a desired constitution of the broadcast video stream, and for receiving the live video feed from the source via a first communication channel, wherein the first control information comprises:
      a manifest describing:
         one or more video components desired to be included in the broadcast video stream, wherein the one or more video components includes a primary video component comprising the live video feed; and
      a playlist, describing a desired temporal assembly of the one or more video components that together comprise at least a portion of the generated broadcast video stream;
      broadcast video stream parameters, comprising at least one of:
         a desired broadcast stream quality of service (QoS); and
         destination broadcast network for transmitting the broadcast video stream;
   a stream processor, comprising:
      at least one pre-processor, for pre-processing the one or more video components according to pre-processing commands;
      stream switcher for temporally switching between the one or more pre-processed video components to assemble a switched video stream having the video feed and other of the one or more video components according to stream switching commands;
      one or more post-processors, for post-processing the switched video stream according to post-processing commands to produce the broadcast video stream;
      a parser, for parsing the live video feed for second control information comprising live queueing information from the source, the live queueing information signaling a live event depicted in the live video feed; and
      a command module, for interpreting the first control information and the second control information to generate the pre-processing commands, the stream switching commands, and the post-processing commands including the broadcast video stream parameters;
   wherein the stream switcher further temporally switches between secondary video components not described in the manifest to assemble the switched video stream.

2. The system of claim 1, wherein:
   the one or more video components includes a graphic to be superimposed on one or more portions of the switched video stream; and
   the one or more post-processors comprises a downstream keyer (DSK) for superimposing graphics on the one or more portions of the switched video stream according to the first control information.

3. The system of claim 1, wherein:
   the live video feed comprises a plurality of data packets;
   the first communication channel is an internet channel having a guaranteed quality of service (QoS) and guaranteed sequence order.

4. The system of claim 1, wherein the first control information is received via the first communication channel from the source of the live video feed.

5. The system of claim 1, wherein the first control information is received via a second communication channel.

6. The system of claim 1, wherein the one or more post-processors further inserts time codes signaling temporal locations in the broadcast video stream for insertion of downstream further secondary video components.

7. The system of claim 1, wherein:
   the system further comprises:
      an audit module, for monitoring the broadcast stream to generating billing information from the monitored broadcast stream.

8. A method of automatically generating a broadcast video stream from at least a live video feed from a source remote in near real time, comprising the steps of:
   accepting first control information in a virtual media control system, the first control information specifying a desired constitution of the broadcast video stream, the first control information comprising:
      a manifest describing:
         one or more video components desired to be included in the broadcast video stream, wherein the one or more video components includes a primary video component comprising the live video feed; and
         a desired temporal assembly of the one or more video components that together comprise at least a portion of the generated broadcast video stream;
      broadcast video stream parameters, comprising one or more of:
         a desired broadcast stream quality of service (QoS); and
         destination broadcast network for transmitting the broadcast video stream;
   accepting the live video feed in the virtual media control system from the source via a first communication channel;

accepting second control information from the source, the second control information comprising live queueing information signaling a live event depicted in the live video feed; and automatically processing the live video feed according to the first control information and the second control information to generate the broadcast video stream.

9. The method of claim 8, wherein the first control information is accepted from the source of the live video feed via the first communication channel.

10. The method of claim 9, wherein the method further comprises parsing the live video feed to extract the live queueing information.

11. The method of claim 10, wherein the step of automatically processing the live video feed according to the first control information and the second control information comprises:

stream switching between the live video feed and another of the one or more video components according to the live queueing information.

12. The method of claim 8, wherein the step of automatically processing the live video feed according to the first control information further comprises:

interpreting the first control information to generate pre-processing commands; and pre-processing at least one of the one or more video components according to pre-processing commands to generate preprocessed video components;

interpreting the first control information to generate stream switching commands;

further stream-switching between the one or more pre-processed video components to assemble a switched video stream according to the temporal assembly of the one or more video components;

interpreting the first control information to generate post-processing commands to generate the broadcast video stream; and post-processing the switched video stream to generate the broadcast video stream.

13. The method of claim 8, wherein the one more video components further comprises an advertisement inserted at a temporal location within the live video feed according to at least one of the first control information and the second control information.

14. The method of claim 12, wherein post-processing the switched video stream comprises inserting a time code in the broadcast video stream indicating a temporal location for inserting a video component absent from the first control information.

15. The method of claim 8, wherein the one or more video components comprise a graphic to be superimposed on one or more portions of the switched video stream.

16. The method of claim 8, wherein:

the live video feed comprises a plurality of data packets;

the first communication channel is an internet channel having a guaranteed quality of service (QoS) and guaranteed sequence order.

17. An apparatus of automatically generating a broadcast video stream from at least a live video feed from a source remote in near real time, comprising:

means for accepting first control information in a virtual media control system, the first control information specifying a desired constitution of the broadcast video stream, the first control information comprising:

a manifest describing:

one or more video components desired to be included in the broadcast video stream, wherein the one or more video components includes a primary video component comprising the live video feed; and a desired temporal assembly of the one or more video components that together comprise at least a portion of the generated broadcast video stream;

broadcast video stream parameters, comprising one or more of:

a desired broadcast stream quality of service (QoS); and destination broadcast network for transmitting the broadcast video stream;

means for accepting the live video feed in the virtual media control system from the source via a first communication channel;

means for accepting second control information comprising live queueing information, the live queueing information signaling a live event depicted in the live video feed; and means for automatically processing the live video feed according to the first control information and the second control information to generate the broadcast video stream.

18. The apparatus of claim 17, wherein the live queueing information is accepted from the source in the live video feed, and the apparatus further comprises means for parsing the live video feed to extract the live queueing information.

19. The apparatus of claim 18, wherein the means for automatically processing the live video feed according to the first control information and the second control information comprises:

means for stream switching between the live video feed and another of the one or more video components according to the live queueing information.

20. The apparatus of claim 19, wherein:

the means for stream switching further temporally switches between secondary video components not described in the manifest to assemble the switched video stream.

21. The apparatus of claim 19, wherein the means for stream switching comprises:

at least one pre-processor, for pre-processing the one or more video components according to pre-processing commands;

stream switcher for temporally switching between the one or more pre-processed video components to assemble a switched video stream having the video feed and other of the one or more video components according to stream switching commands;

one or more post-processors, for post-processing the switched video stream according to post-processing commands to produce the broadcast video stream.

22. The apparatus of claim 21, wherein:

the one or more video components includes a graphic to be superimposed on one or more portions of the switched video stream; and the one or more post-processors comprises a downstream keyer (DSK) for superimposing graphics on the one or more portions of the switched video stream according to the first control information.

23. The apparatus of claim 21, wherein the one or more post-processors further inserts time codes signaling temporal locations in the broadcast video stream for insertion of downstream further secondary video components.

24. The apparatus of claim 17, wherein:

the live video feed comprises a plurality of data packets;

the first communication channel is an internet channel having a guaranteed quality of service (QoS) and guaranteed sequence order.

25. The apparatus of claim 17, wherein the first control information is received via the first communication channel from the source of the live video feed.

26. The apparatus of claim 17, wherein the first control information is received via a second communication channel.

27. The apparatus of claim 17, wherein:
   the apparatus further comprises:
      an audit module, for monitoring the broadcast stream to generating billing information from the monitored broadcast stream.

* * * * *